Patented Oct. 18, 1927.

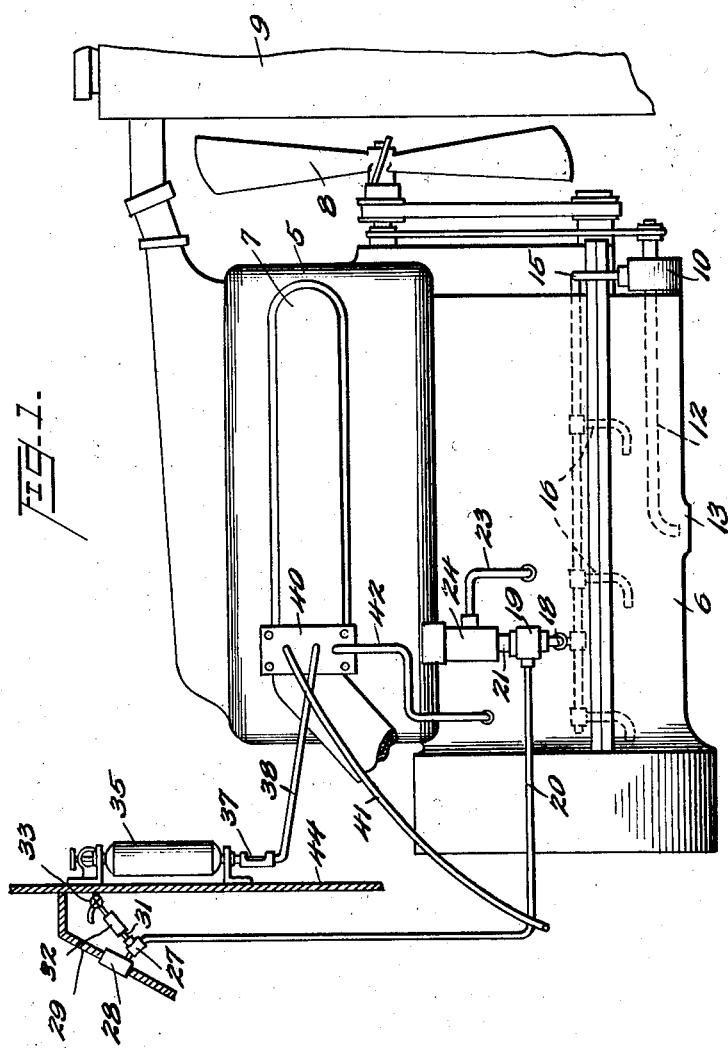

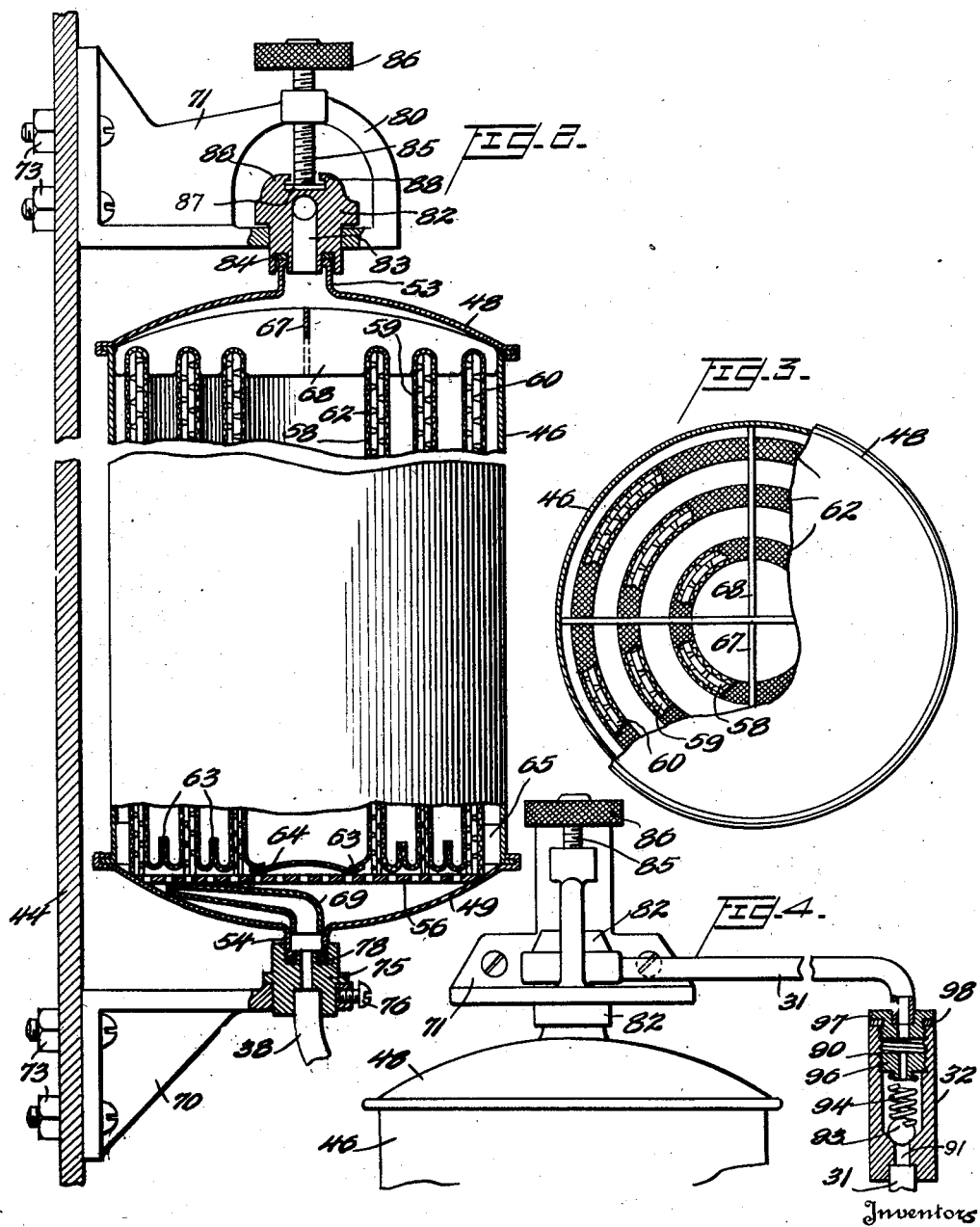

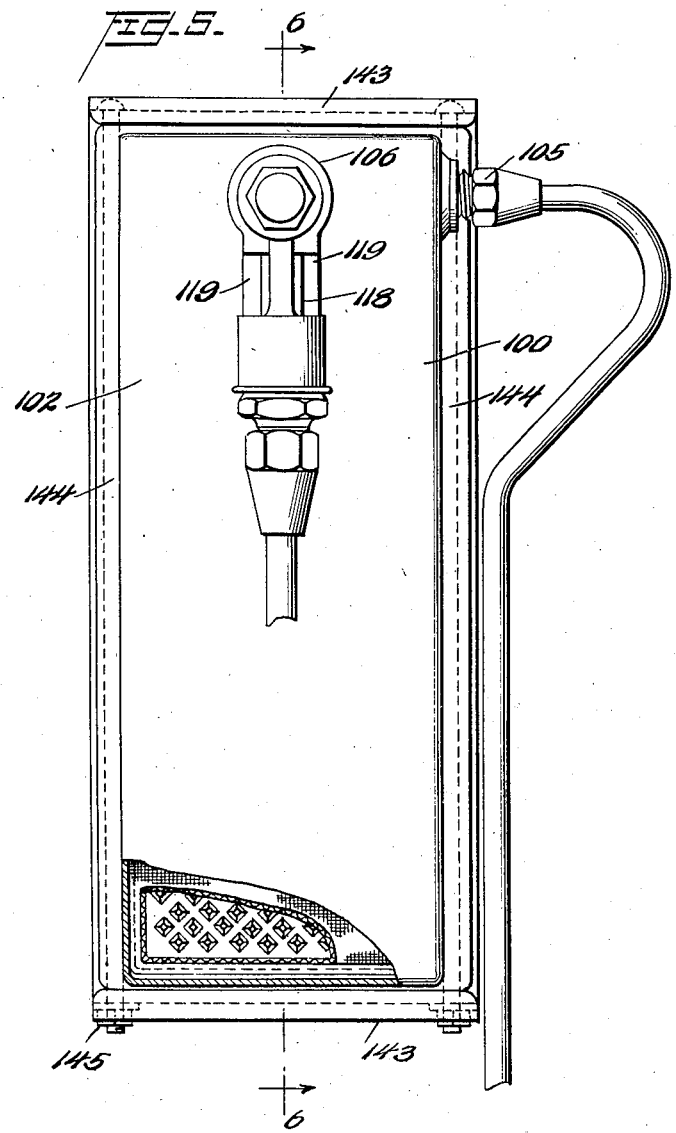

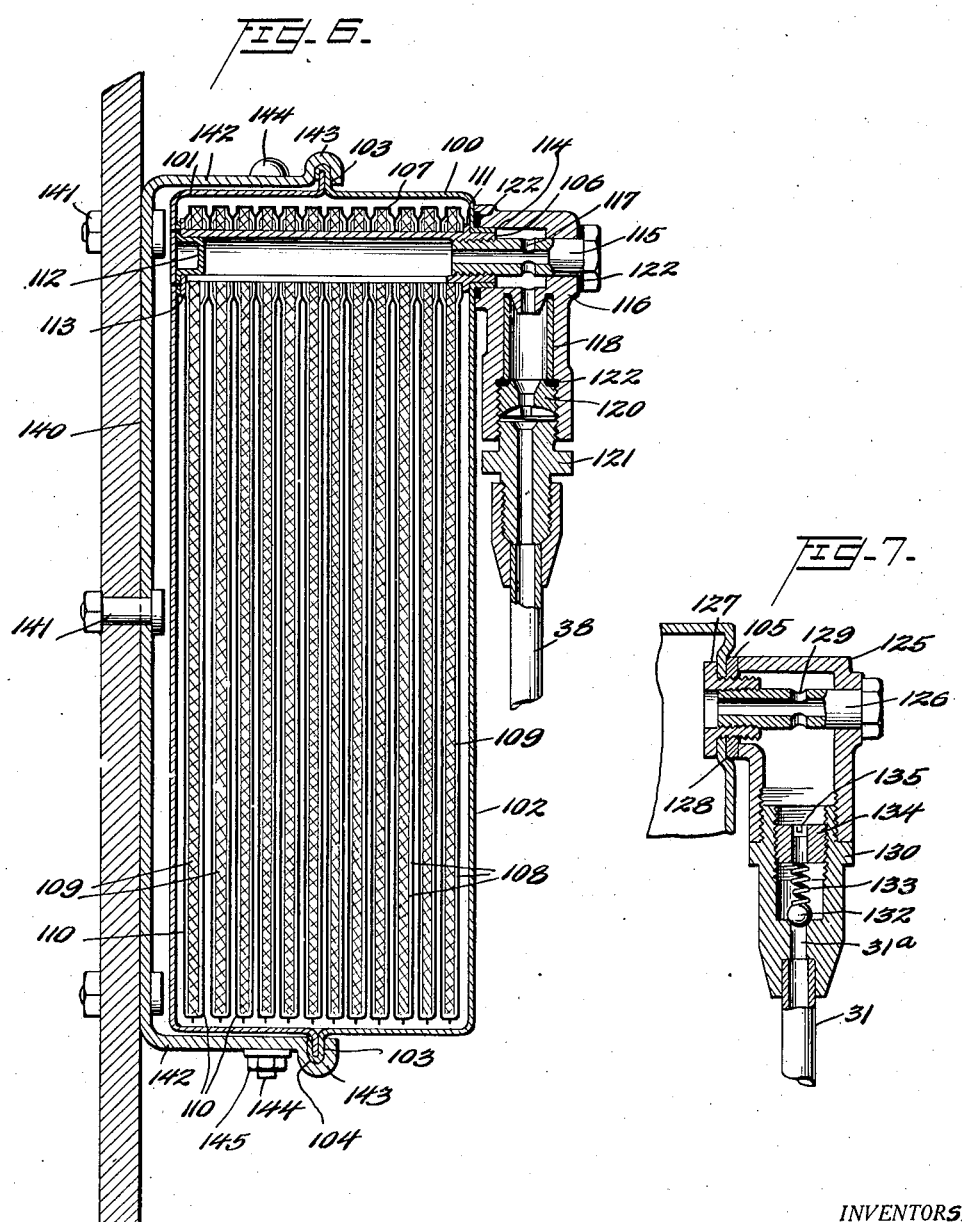

1,646,378

UNITED STATES PATENT OFFICE.

ERNEST J. SWEETLAND, OF HAZLETON, PENNSYLVANIA, AND GEORGE H. GREENHALGH, OF NORTH ARLINGTON. NEW JERSEY; SAID GREENHALGH ASSIGNOR TO SAID SWEETLAND.

RENEWABLE FILTER UNIT.

Original application filed November 27, 1923, Serial No. 677,344. Divided and this application filed August 27, 1927. Serial No. 215,972.

This invention relates to an apparatus for filtering and more especially to the removal of solid carbon, metal particles, sediment, water and other deleterious matter from the oil used to lubricate machine bearings, etc., by means of a suitable filter.

In the use of a filter for this purpose the solid particles gradually accumulate upon the filtering element in the form of a deposit or cake until they become so thick as to render the element unfit for further use in filtering the oil until the cake has been removed. It has been customary heretofore, on account of the expense of such filtering element, to remove the filter unit as a whole, open and clean the same and then replace the same unit and element in the path of the oil, or else open the casing, take out the filtering element and clean it, clean out the inside of the casing, then reassemble the element in the casing and close the casing. It is, however, difficult in either case to completely remove the cake without injuring the fabric of the filtering element, and at best the fabric is never, under practical working conditions, thoroughly cleaned, with the result that the filter never operates at maximum efficiency except the first time it is placed in service.

It is, therefore, the purpose of the present invention to provide a cheap, renewable filter unit which can be removed as a unit from the path of the oil when it becomes unfit for further use and replaced by a complete new unit.

Another object is to provide an efficient filter unit for the purpose, which can be cheaply manufactured and therefore economically discarded when it becomes unfit for further use.

Another object of the invention is to provide a filter unit in which the filtering element is permanently sealed in a substantially imperforate casing thereby insuring that the filter cannot be tampered with or injured and providing a reliable guarantee of the efficiency and operation of the filter.

Various other objects and advantages will appear as the description of the invention proceeds.

The invention is described and illustrated by way of example in connection with the lubricating system of an internal combustion engine wherein the deleterious solids are removed from the oil without removing the oil from the engine, and whereby the oil used in lubricating the internal combustion engine may be constantly and permanently freed of the deleterious matter with which it may become contaminated during the operation of the engine, with the result that the oil is maintained at all times in a substantially clean condition. It will be obvious however that the principles of the invention are applicable to the filtration of other liquid or gaseous fluids. In attaining this result, the lubricating oil of the internal combustion engine or other machine is constantly purified without removing it from the circulatory system by causing all or a portion of the oil to pass through a filter capable of intercepting the deleterious matter which forms as a deposit or cake on said filter, whereupon at intervals the filter unit as a whole may be removed from the circulatory system, taking with it the deposit or cake in situ upon the filtering element. Or, stating the matter more specifically, in attaining the object of the invention as applied to internal combustion engines, we provide a lubricating system which is characterized by the fact, among others, that the filter by which the impurities are removed from the oil may be bodily removed as a unit from the system and discarded when it has become so filled with impurities that the passage of oil therethrough is unduly impeded. The filter provided for this purpose is so constructed and arranged that its removal and replacement by a new filter can be accomplished easily and quickly, and so that it cannot be opened, cleaned or tampered with without destroying the unit, thereby forestalling any ill considered attempts to clean or repair the same which might injure or destroy the efficiency of the unit, and it is cheap to make so that it may be discarded without unnecessary expense.

In applying a device of this kind to an automobile compactness is of prime importance and we have found that the efficiency of new filter fabric is so much greater than that of a fabric which has repeatedly been cleaned that a great saving in weight and space is effected by supplying a cheaply constructed filter which can be rejected and replaced by a new one at frequent intervals, In addition to this distinct advantage it is obviously a much cleaner and quicker operation to remove and replace the replaceable filter unit than it is to clean even the most efficiently constructed cleanable type filter.

Another advantage of substituting a new filter unit for the old and of building the unit so as to prevent attempted cleaning is that when cleaning is attempted on the old filters, the filter fabric is liable to be injured so that a portion of the oil may flow through the filtering element without having the solid particles removed therefrom and as this condition is not readily detected by the inexperienced this incomplete or inefficient filter unit may permit injury to the bearings while the car owner is depending upon the filter, by permitting the sediment and solid particles to collect in the oil. By using a sealed filter unit casing however the element cannot be tampered with after it leaves the factory and perfect operation of the filter is therefore assured.

Referring now to the drawings which illustrate the preferred forms of embodiment of our invention applied to filtering of lubricating oil in an internal combustion engine;

Figure 1 is a side elevation, more or less diagrammatic in form, of an internal combustion engine having our invention applied thereto.

Fig. 2 is an elevation, partly in section of one form of our improved filter and the means for supporting it.

Fig. 3 is a top plan view partly in section, of said filter.

Fig. 4 is a fragmentary elevation, partly in section of the top portion of said filter.

Fig. 5 is a front elevation, partly in section, showing another desirable form of our filter mounted on its support and connected to the pipes of a lubricating system or the like.

Fig. 6 is a sectional view on the line 6—6 of Fig. 5.

Fig. 7 is a vertical section of a preferred form of supply pipe coupling.

In the embodiments of Figs. 1 to 4, the invention is illustrated in connection with an automobile engine shown in Fig. 1, which comprises the cylinder block 5, the crank case 6, exhaust manifold 7, fan 8, and radiator 9. In accordance with the common practice, it is assumed that the lubricating oil for the engine is stored in the bottom of the crank case 6, from which it is drawn by the oil pump 10 and supplied to the bearings and to the devices which free the oil from deleterious matter after which it flows back to the crank case. The oil pump 10 is shown as connected on its intake side to the pipe 12, the end of which extends preferably to the lowest point in the crank case, for example, into the depression 13; and on its outlet side said pump is connected to the pipe 15, from which branch pipes such as 16 lead to the various bearings to be lubricated. Branching from the pipe 15 is a pipe 18, provided with a T fitting 19, to which pipes 20 and 21 are connected. The pipe 21 is connected to a pipe 23 leading back to the crank case 6, through the safety valve 24, which may be of any simple form. Normally, the valve 24 does not permit the oil to pass back to the crank case through it, but this valve will open if the pressure against which the oil pump 10 is working is abnormally increased on account of excessive viscosity of the oil or due to high speed of the engine.

As shown in the drawings, the pipe 20 leads through the T fitting 27 to an oil gage 28, mounted in the instrument board 29. Connected with the other outlet of the T fitting 27 is a pipe 31 in which may be interposed a loaded valve 32 or other resistance means hereinafter described, and a cock 33 This pipe 31 is connected to the intake end of the filter 35, capable of removing carbon, metal particles, sediment, water and other deleterious matter from the oil. At its outlet end, the filter 35 may be connected, preferably through a sight-feed pipe 37 to a pipe 38, leading to a distilling device 40 which is mounted adjacent to and is heated by the exhaust manifold 7 or leading directly back to the crank case. The detail construction of the distilling device 40 need not be herein described as it forms no part of the present invention, further than to say that it serves to distill out of the lubricating oil the major part of the gasoline, kerosene and other light hydrocarbons, and any water which may pass through the filter, the distillate escaping through the pipe 41 may be collected in a suitable receptacle or may be allowed to escape to the atmosphere, while the lubricating oil returns to the crank case through the pipe 42.

Having described the manner in which the various parts of the lubricating system shown in Fig. 1 are connected and co-operate with one another, the details of the preferred form of embodiment of the filters and the means by which they are removably mounted on the dash 44 of the vehicle will now be described.

Referring to Figures 2, 3 and 4, the casing of the filter is shown as comprising a cylindrical shell 46, preferably of sheet metal, to the ends of which are permanently attached dished heads 48 and 49. The ends of the shell 46 are preferably bent outwardly and the flanges thus provided are engaged by rolled or crimped edges of the heads 48 and 49, the joints thus formed being sealed in a convenient manner as by rolling or brazing or soldering. The members 48 and 49 are provided with necks 53 and 54 having openings therethrough which serve as intake and outlet passages of the filter. Before the upper head 48 is attached to the casing 46, the filtering element or filtering materials, which may be of any desired form, are installed therein. In the particular form of filter shown in Figs. 2, 3 and 4, the filtering element or filtering materials are supported upon a foraminous plate 56, which rests on the inside of the dished head 49. This plate 56 supports a plurality of tubular drainage members 58, 59 and 60 which are concentrically arranged. These drainage members, which may be conveniently formed of foraminous sheet metal, are covered with any suitable filter cloth, such as cotton, canvas, or drill. This fabric may or may not be treated chemically or otherwise to improve its filtering qualities. It is understood that instead of filter cloth the casing may be packed with any suitable filtering medium, however it is preferred to use a filtering element of the general form shown in the drawings which comprises the filter cloth 62 made of a plurality of pieces, sewed together as indicated at 63 and then assembled over the drainage members 58, 59 and 60. Within the drainage member 58, the filter cloth forms a bag, the bottom 64 of which covers the top of the central portion of the foraminous plate 56; and the portions of the foraminous plate between the drainage members 58 and 59 and between the drainage members 59 and 60, are similarly covered by the filter fabric; while the outer edge of the filter fabric is held against the outside of the drainage member 60 by a ring 65 of felt or other suitable material, interposed between the fabric and the shell 46. In order to hold the tubular drainage members 58, 59 and 60 stationary within the filter casing under the influence of vibration to which the filter may be subjected, there is preferably interposed between the head 48 and the upper edges of said drainage members, a spacing member, of any suitable kind, for example, one made of two pieces 67 and 68 of stamped metal of the form shown, slotted and fastened together in the form of a cross. Other cheap and effective forms of filtering element will suggest themselves to those skilled in the art and obviously they may be used instead of the particular type just described without departing from the spirit of our invention.

Although a filter of the kind we have shown and described is preferably used with its axis in a vertical position as shown in the drawings, it may under some conditions be found desirable to mount the filter with its axis horizontal. In order to facilitate the escape of trapped air when the filter is so mounted, there may be provided within the dished head 49 a tube 69 of the form shown, connecting with the outlet through the neck 54 in the head 49. When this tube 69 is provided, the outside of the filter casing is appropriately marked so as to indicate that it should be mounted in a position corresponding to the upright position of the tube 69.

As hereinbefore stated, the filter which has just been described is constructed with the idea that it will be removed and thrown away after it has been used sufficiently long to become so filled with impurities extracted from the oil that its usefulness has been materially lessened, if not entirely destroyed, and also with the idea that it cannot be tampered with, cleaned or injured without necessitating a new filter unit, thereby assuring that only 100% efficient unit can be used.

As the invention covered hereby is addressed particularly to the non-openable discardable filter unit per se, the manner of its connection in the lubricating system is not of consequence, the same being covered in our copending application Serial No. 677,344. In order to illustrate the operation of the filter in the system, however, a preferred method for supporting the filter unit will be described.

As shown in Figs. 1 to 4, the support for the filter may comprise a lower bracket 70 and an upper bracket 71 which may be secured to the dash 44 by bolts 73, or may be supported in any other suitable manner. The lower bracket 70 supports a removable seat 75 which may be secured in a hole in the bracket by means of a set screw 76. The seat 75 is provided with a passage therethrough which at its lower end communicates with the pipe 38, the end of which is permanently secured to said seat in any suitable manner; and at its upper end said passage opens into an enlarged cavity in the seat 75 having therein an annular recess adapted to receive a gasket 78. The end of the neck 54 is adapted to enter the cavity in the top of the seat 75, and the edges of said neck rest on the gasket 78 whereby a tight connection is made between the outlet end of the filter and the seat 75. The upper bracket 71, which is provided with a yoke portion 80 as shown, carries a sliding feed connection 82, which may be of the form shown and which is provided with an opening 83 with which the pipe 31 is in permanent communication. The bottom of this sliding feed connection 82 is provided with an annular cavity at the top of which is inserted a gasket 84 adapted to be engaged by the upper end of the neck 53 of the filter. The feed connection 82 may be moved vertically in the bracket yoke 80 by means of a screw 85, threaded in the top of the bracket yoke and provided at its upper end with a knurled head 86 and at its lower end with a flange 87 engaging the top of the feed connection 82 and lips 88 provided thereon. With this arrangement, it will be obvious that the feed connection 82 may be raised and lowered by means of the screws 85 for the purpose of permitting a used filter to be removed and a new one inserted. By screwing the screw 85 downwardly, after the filter has been inserted between the seat 75 and the sliding feed connection 82, the gaskets 78 and 84 are put under compression and leakage at the outlet and inlet openings of the filter is effectively prevented.

The construction and the function of the loaded valve or other resistance means 32 will now be described. This means, obviously, may be of many forms, such as an adjustable valve, fixed restricted orifice, spring-loaded valve or the like. We have shown in cross section in Fig. 4 an appropriate form of valve comprising a casing having a cavity therein which at one end is threaded as indicated at 90, and at the other end communicates with a passage 91. Communication between the cavity and the passage 91 is controlled by means of a ball valve member 93, which is yieldingly held in the position shown by means of a spring 94 put under compression between the ball 93 and a perforated plug 96 adapted to be screwed into the threaded portion 90 of the valve casing. There is also screwed into the threaded portion 90 of the casing a perforated flange cap 97 with which a gasket 98 cooperates. As hereinbefore stated, this loaded valve 32 is interposed in the pipe 31; and it will be obvious from Fig. 4 how the ends of the pipe 31 are connected to the said valve. The purpose of the valve 32 is to insure that the path of the oil through the filter will always offer at least a considerable resistance to the flow of the oil therethrough. A new, clean filter inserted in the system may offer at first comparatively little resistance to the passage of oil therethrough, and if the valve 32 or its equivalent were not employed, it might happen in some cases that the path of oil through the filter would offer so much less resistance to the flow of oil than the paths for the flow of oil through the engine bearings, that the pressure of oil supplied to the latter would be insufficient to sufficiently lubricate said bearings. By providing the loaded valve 32, this possibility is prevented.

In the form of embodiment illustrated in Figs. 5 to 7, the filter casing comprises a pair of rectangular members 100 and 101 preferably of sheet metal fastened together to form a fluid tight non-openable casing 102 by means of flanges 103 and 104, by crimping the one over the other, as shown, or by brazing, soldering or the like.

An inlet opening for the dirty oil is provided at 105, and a flanged outlet opening for the filtered oil is shown at 106. The drainage tube 107 for the filter elements 108 projects into the flanged opening 106 and is partially supported thereby as indicated in Fig. 6. The filter elements 108, which are held in spaced rleation upon the tube 107, consist of hollow drainage members 109 covered with a suitable filter fabric 110, which may carry upon its surface a filter aid or dressing, such as kieselguhr or the like, the filtering elements being adapted in any case to remove all suspended solids and deleterious matter from the oil as it passes through the casing. The drainage members 109 communicate with the drainage tube 107, so as to discharge only the purified oil from the casing at the outlet 106.

To facilitate the assembling of the filter, the tube 107 is provided with a collar 111, which provides an abutment for the casing member 102, when the filter is sealed, and the member 101 is provided with a stamping 112, which projects into the end of the tube 107 to position and support the same in the casing. A gasket 113 carried on the stamping 112 provides a fluid tight seal for one end of the tube 107.

For attaching the outlet connections to the casing the tube 107 is internally threaded at 114 and a hollow bolt 115 is arranged to screw into the tube, to hold the discharge connection 116 against the filter casing. The hollow bolt 115 is provided with a cross bore 117 so as to discharge the filtered oil into the connection 116 in any position to which it may be turned.

A sight glass 118 is inserted in the connection 116 which is provided with a suitable opening 119 through which the glass 118 and the oil flowing therethrough may be observed. Suitable gaskets 122 are provided as indicated to form a fluid tight seal between the various parts of the connection. The glass 118 is held in position in the connection 116 by a plug 120 threaded into the connection and a union 121 which screws into the end of the connection and provides communication between the connection and the discharge pipe 38.

The inlet connection 125 is attached to the casing by means of a hollow bolt 126 which screws into a threaded thimble 127 in the wall of the casing to force the connection 125 into fluid tight engagement with a gasket 128 positioned between the connection and the wall of the casing. A cross bore 129 in the bolt 126 provides a passage for the oil between the connection 125 and the interior bore of the bolt 126 in any position to which the bolt may be turned.

A nipple 130 screws into the connection 125 at its lower end to provide a connection with the oil supply pipe 31. This nipple is provided with a loaded valve 132 pressed into the opening 31ᵃ, from the supply pipe by a spring 133. An adjustable screw plug 134 is provided for permitting proper adjustment of the valve, and a hole 135 through the screw plug permits the oil to pass freely therethrough. The function of the loaded valve 132 and its parts is similar to that of the valve 32 heretofore described.

It is, of course, obvious that the inlet and outlet connections described permit the filter casing to be readily inserted into and removed from the circulatory system as it is only necessary to remove the bolts 115 and 126 to disconnect the connections and to screw them into their respective openings to fasten the connections to the new filter unit. Any other suitable form of inlet and outlet connection may however be used.

To support the filter unit 102, and hold it in position for easy removal and replacement, a bracket 140 is secured in any convenient position relative to the machine by means of the bolts 141. The ends of the bracket project outward at 142 and are provided with crimped edges 143 to receive and support the flanges 103 and 104 of the filter casing. To prevent the casing 102 from accidentally sliding out of the holder, bolts 144 are provided which extend from the upper projection 142 to the lower projection 142, and are secured in the projections by the nuts 145.

To remove the filter unit from the machine when it is desired to discard the same the inlet and outlet pipes are disconnected and one of the bolts 144 removed, whereupon the casing may be slid sidewise out of the crimp 143. The term unit as used in the claims of this specification is intended to include both the filter and casing which are discarded as a unit and it is to be noted that by discarding the entire filter and casing, the sediment collected upon the filter as well as that which has settled in the bottom of the casing is entirely removed from the system whereas the discarding of only the filter without the casing as has heretofore been proposed, may remove only the sediment collected upon the filter fabric, and leave the heavier particles which have settled into the bottom of the casing in the circulatory system where they may be stirred up by vibrations of the machine and carried again into the circulation.

To forestall attempts to clean the filter or to otherwise tamper with the operation thereof without discarding the unit, the casing is sealed as heretofore described during the process of manufacture so that it cannot be opened without destroying the same.

By describing the filter casing in the specification and claims as imperforate except for the inlet and outlet openings and as non-openable, we mean to define a filter casing which is permanently closed by some means such as folding and pressing or spinning the sheet metal parts together, or soldering, welding, or the like, so that the casing cannot conveniently be opened or closed again without destroying it, unless unusual mechanical methods not ordinarily available to the layman are resorted to and so that the filter elements cannot be removed therefrom; the particular idea being to assure that the unit cannot be tampered with and will be discarded when it has once served its purpose. Of course, a drain plug or the like so small as not to permit tampering with or removal of the filter element may be inserted in the filter casing without departing from the invention.

The mode of operation of the system and the apparatus herein described will be obvious. The oil pump 10, drawing oil from the crank case supplies it under pressure to the engine bearings and also to the filters 35 or 102, located in the oil line, from which the oil, substantially free of deleterious matter, flows back to the crank case. As illustrated in the drawings, the effective area of the filtering elements is several times greater than the cross-sectional area of the enclosing casing, so that under ordinary circumstances, the filters will not become so filled with impurities as to interfere with their function until the machine has been used for a considerable period of time, for example, in the case of an automobile, operated under ordinary circumstances, until the car has been run ten thousand miles or more. The proper time to remove the filter unit and replace it by a new one can be determined in different ways; for example, by observing in the sight feed pipes 37 or 118, the volume and condition of the oil coming from the filter by taking a sample of oil from the crank case and observing its condition, or upon an arbitrary basis according to the length of time the filter has been in use or the number of miles which the automobile has been driven since the filter was inserted. It is a matter of only a few moments' work to remove the filter and insert a new one in the manner hereinbefore described, and this removal and insertion can be attended to by persons unskilled in the filter art without chance of improper assembly. There is thus provided a new method of and means for constantly removing the deleterious matter, such as carbon, metal particles, water, etc., which tends to accumulate in the lubricating oil of an internal combustion engine, or other machines, without withdrawing the oil from the oil circulatory system of the machine.

This application is filed to claim the filter unit per se following a requirement for division made in our copending application Serial No. 677,344, filed November 27, 1923, and is therefore a divisional application.

While we have described and illustrated the embodiments of our invention as applied to an internal combustion engine, it is to be understood that the apparatus and process herein described is not limited to such use but may be applied to the filtering of oil in various ways, and that modification may be made in the embodiments illustrated without departing from the spirit of the invention or the scope of the appended claims.

What is claimed is:

1. As an article of manufacture, a cheap discardable filter unit for use in the lubricating system of an automotive internal combustion engine or other machine comprising a nonopenable, sealed sheet metal casing having a filter element therein capable of removing the solid impurities from the oil passing therethrough, said filter element being of sufficient area to permit the accumulation of solids from the oil for a period equivalent to several thousand miles of running of the automobile before becoming clogged, and inlet and outlet openings through the walls of said casing whereby the casing may be connected to or disconnected from the lubricating system to permit economical discarding of a clogged filter unit and replacement with a new unit.

2. As an article of manufacture, a cheap discardable filter unit for use in the lubricating system of an internal combustion engine comprising a sheet metal casing, the parts of which are permanently sealed together, an inexpensive filter element in said casing adapted to remove solid impurities from the oil passing therethrough, said element and casing being adapted to receive and hold the solid impurities removed from the oil until permanently discarded from said system, said casing being imperforate except for inlet and outlet openings of normal size in the walls of said casing, whereby the casing may be connected to or disconnected from said lubricating system to permit economical discarding of a clogged filter unit and replacement with a new filter unit.

3. As an article of manufacture, a cheap discardable filter unit for use in the lubricating system of a machine comprising a filter element capable of removing the solid particles from the oil passing therethrough, and a filter casing of sufficient strength to withstand the normal lubricating pressures of said system, permanently sealed around said filter element and having no openings therein of sufficient capacity to permit access to said filter element, said filter element being of relatively large area as compared with the size of said casing, and inlet and outlet openings into said casing whereby the filter unit may be quickly connected to or disconnected from said lubricating system to permit economical discarding of a clogged filter unit and replacement with a new unit.

4. As an article of manufacture, a sealed discardable filter unit for use in the lubricating system of an automotive internal combustion engine comprising a filter element capable of removing the solid particles from the oil passing therethrough and of sufficient capacity to function for a period equivalent to several thousand miles running of the automobile, and a filter casing of sufficient strength to withstand the normal lubricating pressures of said system, permanently sealed around said filter element and having no openings therein of sufficient capacity to permit access to said filter element, and inlet and and outlet openings into said casing whereby the filter unit may be connected to said lubricating system, said unit being constructed to permit economical discarding of the unit when the filter element has become clogged and replacement with a new unit.

5. As an article of manufacture, a sealed discardable filter unit for the lubricating system of a machine, comprising a sealed non-cleanable filter casing, a filter element in said casing adapted to remove the deleterious solids from the oil passing therethrough and to retain said solids on the surface of said element, said casing being imperforate except for inlet and outlet openings therein of approximately the size of the oil conduits of said system, and means for cooperating with the conduits of said system whereby the filter unit may be connected to or disconnected from said system to permit economical discarding of a used filter unit with the solids in situ therein and replacement with a new unit.

In testimony whereof I have affixed my signature to this specification.

ERNEST J. SWEETLAND.

In testimony whereof I have affixed my signature to this specification.

GEORGE H. GREENHALGH.